Oct. 23, 1923.　　　　　1,471,670

F. W. SMITH

STERILIZER

Filed Dec. 19, 1921　　　2 Sheets-Sheet 1

Inventor.

Frank Wendell Smith

Oct. 23, 1923.

F. W. SMITH

STERILIZER

Filed Dec. 19, 1921

1,471,670

2 Sheets-Sheet 2

Inventor.
Frank Wendell Smith

Patented Oct. 23, 1923.

1,471,670

UNITED STATES PATENT OFFICE.

FRANK WENDELL SMITH, OF PORTLAND, MAINE.

STERILIZER.

Application filed December 19, 1921. Serial No. 523,537.

*To all whom it may concern:*

Be it known that I, FRANK WENDELL SMITH, a citizen of the United States, residing at Portland, in the county of Cumberland and State of Maine, have invented new and useful Improvements in Sterilizers, of which the following is a specification.

My invention relates to improvements in the design and construction of machines for sterilizing or pre-heating food products by the use of super-heated steam, and especially in my method of applying this heat to the food.

I am aware that there are now on the market devices for which the manufacturers of same claim the attainment of this object; but so far as I know, none completely fulfill the requirements for which they were designed. In some, the attempt is made to emit the steam through revolving paddles or blades, but condensation takes place and instead of dry, super-heated steam there is water or very wet saturated steam which eventually comes in contact with the food to be sterilized. Then, too, it has heretofore been the almost invariable practice to place these machines some distance from the source or supply of steam, making it practically impossible to get it in a dry and super-heated condition in close proximity to the food product.

Another difficulty which I claim to have eliminated in my process is the matter of the adhesion of the food to the surface of the parts carrying the super-heated agent. I have thoroughly and satisfactorily overcome this by my design of parts which have to do with this operation as I employ an independent super-heater placed closely to the sterilizer proper and admit the highly super-heated steam through small apertures drilled in bosses or projections extending downwardly from bottom of container and upwardly from top of steam chamber, allowing an air space between these two surfaces which keeps the bottom of container somewhat cooler than the temperature of the steam or the surrounding parts. This has a tendency to prevent the food sticking or caking on to the surface of the bottom of container, while at the same time the steam is forced upward into the food to be sterilized.

Figures 1, 2:
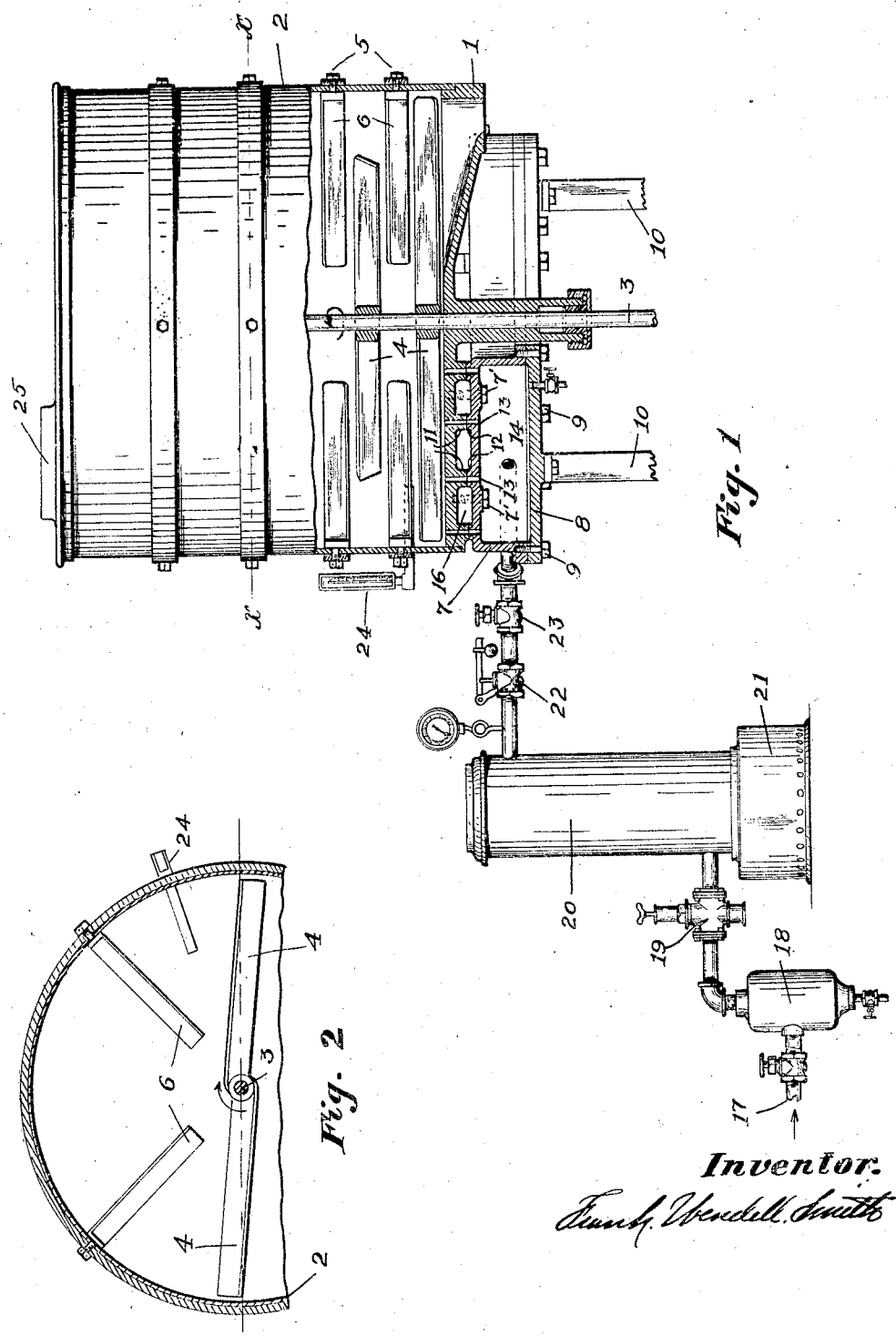
Figure 3:
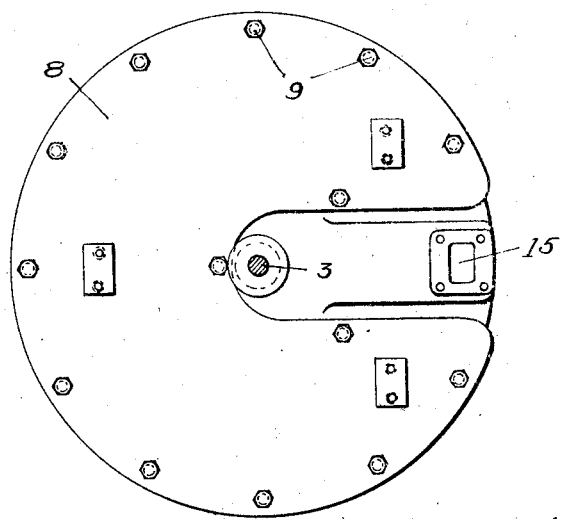
Figure 5:
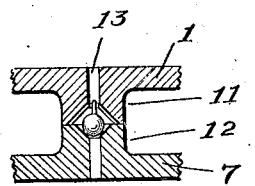
Figure 6:
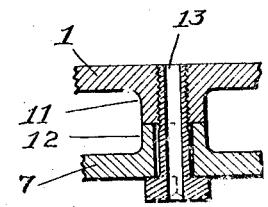
Figure 4:
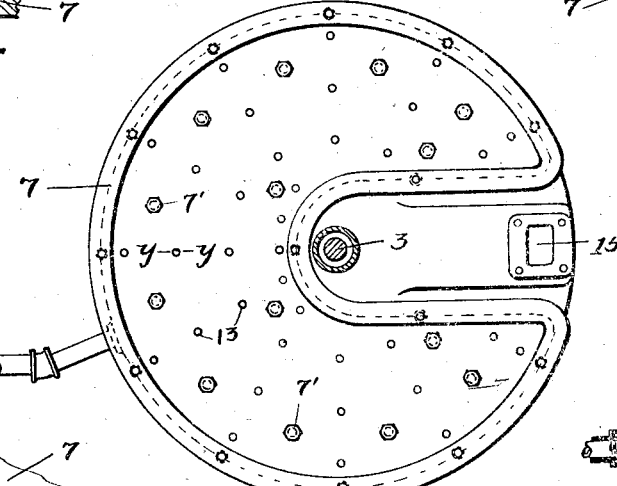
Figure 7:
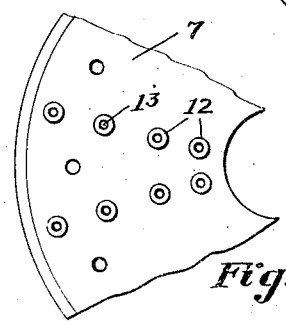
Figure 8:
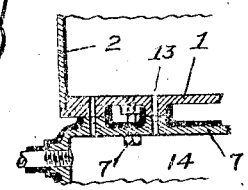

Proceeding with a detailed description of my sterilizer, aided by the accompanying drawings, Fig. 1 is an assembly of the most essential parts, with the super-heater and controlling devices included,—the sterilizer itself being in part section; Fig. 2 is a sectional plan view of hopper or container for food, on line $x$—$x$, of Fig. 1, showing paddles in full lines; Fig. 3 is an inverted plan of sterilizer, showing cover attached; Fig. 4 is an inverted plan of sterilizer with cover of steam chamber detached; Fig. 5 is a sectional view through one of the steam ports out of steam chamber, as on line $y$—$y$, Fig. 4, showing ball-check in port; Fig. 6 is a section through one of the steam ports, showing another method of securing the steam chamber and sterilizer casting together, utilizing the hollow bolt as a steam passage; Fig. 7 is a part plan of top of steam chamber, showing bosses through which are the steam ports or passages, and Fig. 8 is a part vertical view, in section, showing insulation applied to steam chamber and bosses.

Similar numerals refer to similar parts throughout the several views.

In Fig. 1, mounted on a casting 1, and forming its bottom, is a hopper 2; revolubly mounted in center of casting 1, and extending upwardly into hopper, is shaft 3. attached to which are blades or paddles 4. with edges set on a tangent with hubs of same, and faces set at an upward angle from horizontal, as seen in Fig. 2. and placed at intervals vertically on shaft 3. Extending from inner side of hopper toward the center and rigidly secured to hopper by bolts 5 are stationary blades 6 placed in vertical rows between the movable blades 4. The faces of these blades are also set at an upward angle from horizontal, and in conjunction with the movable blades thoroughly mix the product being sterilized and tends to keep the mass moving upward.

Mounted beneath the casting 1 is steam chamber casting 7, rigidly secured to casting 1 by bolts 7', and on the flanged bottom of which is attached a cover 8 by means of bolts 9. The whole structure is supported on legs 10 which extend downwardly to foundation of a filling machine (not shown) or to the floor. Shaft 3 is driven by any suitable power. Lower blade 4 is in close proximity to top of casting 1 and it has three functions,—namely, to keep food constantly moving and becoming impregnated with the incoming steam from steam chamber; to prevent food from becoming attached to bottom of container, and to serve as a carrier food out of container through chute in bottom of same.

Extending downwardly from casting 1 are bosses 11, finished faces of which meet and register with similar bosses 12 extending upwardly from casting 7. Through these bosses are drilled holes 13, which admit super-heated steam from steam-chamber 14 into hopper or container 2. As the heat of this steam rises in the mass of food in hopper it gradually lessens in intensity, as a matter of course, but attention is called to the fact that the hottest section of food is immediately on the bottom of the hopper, and insures a thorough heating of same before blade 4 in its turning movement around hopper sweeps the product out through chute 15.

By observing Fig. 1 it will be seen that I separate the steam chamber top from the hopper bottom a certain distance, as at 16, for reasons which I have already explained in my preamble, namely, to prevent the tendency of food to stick to super-heated parts and cake on, and in allowing the air to circulate freely under the hopper bottom I am able to add a very desirable feature in my design by keeping this surface slightly cooler than the surrounding parts or the steam itself.

In Fig. 1 all parts are shown stripped of insulation but as a matter of fact I propose, in most instances, although not necessarily imperative in all, to cover pipes, fittings and the casting 7 with proper insulating material, so as to preserve, as nearly as is possible, the super-heated condition of the steam as it leaves the super-heater. In Fig. 8 I have illustrated this by showing heavy black surface around the parts which need insulation.

In operation, steam from boiler enters the apparatus at 17 passing through trap or separator 18, then through reducing valve 19 into super-heater 20, at the bottom of which is furnace 21. Safety valve 22 and stop valve 23, working in conjunction will determine both pressure and temperature of steam in steam chamber 14, as a throttling down of valve 23 compels steam to remain a longer space of time in heater, thereby raising temperature,—also pressure. And in case I wish to operate the mechanism independently of the automatic devices, I may eliminate the automatic features of regulation by adjustment of the screw in reducing valve 19, raising valve off its seat in safety-valve 22 and by the manipulation of stop-valve 23 obtain any desired pressure in steam chamber 14.

A thermometer at 24 readily signifies the proper heat to be applied to the food product. In some cases where the latter is of a very liquid nature I prefer to install a small check, either a ball, as shown, or other suitable design, in the steam passage or port, as shown in Fig. 5, thus preventing the flowage of the liquor into steam chamber. I also show in Fig. 6 another method of tying the two castings, 1 and 7, together by means of hollow bolts through each of the adjoining bosses, utilizing the hole in bolt as a steam passage, and am thus enabled to eliminate a mechanical difficulty of drilling small holes in large castings. 25 is an opening through which the food product is fed to hopper.

Having thus described my invention, I claim:

1. In a sterilizer, the combination of a receptacle or container for food products with a vertical, centrally located revolving spindle with blades attached thereto, faces of which blades are so presented to the food to be sterilized as to produce both a lateral and vertical movement to same, tiers of stationary blades secured to inside wall of container interposed between the tiers of revolving ones so as to retard somewhat the movement of the food and thereby cause it to become thoroughly impregnated with the heating agent, means for pre-heating the food by steam, super-heated by an auxiliary and independent heater, separate and apart from the original generator and in close proximity to the food to be acted upon, and means to automatically regulate and control the temperature and pressure of the super-heated steam, substantially as described.

2. In a sterilizer, the combination of a container for food products with means for keeping the mass of food within said container moving, means for the admission of super-heated steam to the bottom of this mass of food from a chamber beneath said food container, outlets for steam from said chamber to said container being so constructed as to allow a portion of bottom surface of said container to be ventilated or partially cooled, means for automatically regulating the temperature of steam entering container, by proper regulating mechanisms, and means whereby an independent control of pressure may be obtained by making inoperative the automatic features of the automatically regulated members and substituting hand operated device, substantially as described.

3. In a sterilizer, the combination of a food container, with means for receiving and discharging food into and from same, means for keeping the food in immediate contact with the bottom of said container constantly in motion, a steam chamber or storage for super-heated steam beneath but not in close contact with said container, means for supplying steam chamber or storage with super-heated steam by independently operated and automatically regulated temperature raising device, subsequently to the original generation of the steam, and placed in close proximity to said steam chamber, means for confining super-heated steam in said chamber and means for procuring a lower temperature to the bottom of said container than that of the entering super-heated steam, substantially as described.

FRANK WENDELL SMITH.